United States Patent [19]
Nishimuro et al.

[11] Patent Number: 5,234,259
[45] Date of Patent: Aug. 10, 1993

[54] RESIN WHEEL WITH MORE THAN TWO INDEPENDENTLY MOLDED PARTS

[75] Inventors: Youichi Nishimuro, Tokyo; Haruo Koyama, Saitama; Kunio Machida; Yoshihide Fukahori, both of Tokyo, all of Japan

[73] Assignee: Bridgestone Corporation, Tokyo, Japan

[21] Appl. No.: 899,590

[22] Filed: Jun. 18, 1992

Related U.S. Application Data

[63] Continuation-in-part of Ser. No. 744,694, Aug. 13, 1991, abandoned.

[30] Foreign Application Priority Data

Sep. 7, 1990 [JP] Japan .................. 2-237790

[51] Int. Cl.⁵ .................. B60B 23/00; B60B 5/02
[52] U.S. Cl. .................. 301/64.7; 301/11.1; 301/64.4; 411/326
[58] Field of Search .................. 301/9.1, 10.1, 35.51, 301/11.1, 11.3, 35.1, 35.2, 63.1, 64.3, 64.4, 64.7, 6.91; 411/190, 326, 949, 950, 961

[56] References Cited

U.S. PATENT DOCUMENTS

| | | | |
|---|---|---|---|
| 857,869 | 6/1907 | Carlson | 411/950 X |
| 1,580,920 | 4/1926 | Roe | 301/63 D |
| 1,672,696 | 5/1928 | Smith | 301/31 X |
| 1,722,541 | 7/1929 | Rossetti | 411/950 X |
| 2,017,034 | 10/1935 | Avery | 301/63 DS |
| 3,167,105 | 1/1965 | Rosán | 411/949 X |
| 3,790,220 | 2/1974 | Manss | 301/63 PW X |
| 4,067,621 | 1/1978 | Reppert | 301/37 A T X |
| 4,173,992 | 11/1979 | LeJeune | 301/63 PW X |
| 4,363,347 | 12/1982 | Baumgartner | 301/63 PW X |
| 4,514,013 | 4/1985 | Woelfel et al. | 301/63 PW |
| 4,896,899 | 1/1990 | Lawrence | 301/63 PW X |
| 5,092,725 | 3/1992 | Aittama | 411/190 |

FOREIGN PATENT DOCUMENTS

| | | | |
|---|---|---|---|
| 684284 | 10/1929 | France | 301/63 DS |
| 0113601 | 5/1987 | Japan | 301/11 R |
| 0215601 | 8/1989 | Japan | 301/63 R |
| 0038101 | 2/1990 | Japan | 301/6 WB |

*Primary Examiner*—Russell D. Stormer
*Attorney, Agent, or Firm*—Kanesaka and Takeuchi

[57] ABSTRACT

A resin wheel consisting of two or more molded parts coupled together. The parts are molded separately and have threaded portions. Then, the threaded portion of one molded part is screwed into the threaded portion of the other molded part so that the parts are fitted and coupled together.

18 Claims, 12 Drawing Sheets

14A 14B 14A 14B 14A 14B 14A 14B

RESIN WHEEL WITH MORE THAN TWO INDEPENDENTLY MOLDED PARTS

This application is a continuation-in-part of application Ser. No. 07/744,694, filed Aug. 13, 1991 now abandoned.

FIELD OF THE INVENTION

The present invention relates to a resin wheel and more particularly, to a lightweight resin wheel which is adapted for mass production and excellent in mechanical characteristics such as impact resistance, bending strength, rigidity, heat resistance, fatigue resistance, and creep resistance.

BACKGROUND OF THE INVENTION

In wheels, automotive wheels are generally made of steel or light alloys such as aluminum alloys and magnesium alloys.

Steel wheels are fabricated by pressing or roll forming. The formed wheels vary greatly from the intended dimensions. Especially, the roundness of the bead seat of the rim often deviates from the desired value. Furthermore, steel wheels are heavy and hence are not desirable, since all automotive parts tend to be reduced in weight.

In contrast, wheels made of light alloys are formed with stable dimensions. In addition, these wheels are much lighter than steel wheels. That is, the weights of light alloy wheels are one third those of steel wheels. However, the materials of light alloy wheels cost three to five times higher than the materials of steel wheels. In this way, light alloy wheels are very expensive.

In recent years, emphasis has been placed on energy saving. To achieve this saving, it is quite important to reduce the weights of automotive parts. Especially, unsprung members such as wheels have been required to be made lighter in weight to improve the fuel economy and maneuverability.

In these circumstances, a resin wheel which is satisfactorily lightweight, can be molded stably, and is economical to fabricate has been proposed recently. This resin wheel consists mainly of a fiber-reinforced plastic, i.e., a resin reinforced with short or long fibers. The resin wheel is lighter and molded with greater stability than the metallic wheel. In addition, resin wheels are adapted for mass production. Therefore, the manufacturing costs can be reduced. Further, the resin wheel is expected to be excellent in colorability and other design factors. Such a resin wheel is required to have the following characteristics.

(1) It is highly resistant to shock, for preventing destruction.
(2) It creeps only a little, to prevent the tire from coming off the wheel.
(3) It is highly resistant to heat generated by the brake drum.
(4) It is excellent in uniformity. Since the wheel is one of the important parts for the automobile, if the molded wheel is nonuniform or has a defect, the wheel cannot be used.
(5) It can be mass-produced.

The upper half of the prior art wheel is shown in FIG. 4. The wheel includes a rim 1 and a disk 2 provided with a hub bolt hole 3. Commercially available aluminum wheels are roughly classified in terms of construction into two major categories: (1) one-piece wheel that is fabricated by molding the rim 1 and the disk 2 integrally; and (2) two-piece wheel which is fabricated by molding the rim 1 and the disk 2 separately and then coupling them together by metal bolts. The two-piece wheel has the great advantage that various combinations of wheels can be offered by changing the design of the disk 2 while retaining the construction of the rim 1. However, the two-piece wheel must have overlapping portions, because the rim 1 and the disk 2 are joined together. Furthermore, the two-piece wheel is heavier than the one-piece wheel, because the overlapping portions are joined together with the metal bolts.

Of course, the light weight of the resin wheel is its prime selling point. To exploit this merit, any construction which increases the weight should be avoided as much as possible. Therefore, the present situation is that the prior art resin wheel takes the form of a one-piece wheel, whether it is fabricated by injection molding or by compression molding.

Where the prior art resin wheel is fabricated by compression molding, the fibers are damaged relatively slightly at the time of the molding. Therefore, the molded wheel is excellent in rigidity, strength, and other factors. In addition, the molded wheel has good heat resistance and good creep resistance, since the used resin consists mostly of a thermosetting resin. However, this molding method is unsuited for molding of complex shape such as a wheel whose wall thickness varies greatly from location to location. Furthermore, the productivity is low, because the molding cycle is long.

In contrast, the injection molding process is quite excellent in productivity and reduces the manufacturing costs. However, the strengths of products fabricated by injection molding are generally one third to one fifth of the strengths of products fabricated by compression molding. Specifically, when resins are kneaded or flow, the fibers are damaged or flow. Then, the fibers and the molecules are oriented, or a weld line is created at the point at which two masses of resin meet. As a result, the physical properties of the material of the molded product become nonuniform or deteriorate, leading to reductions in the strength. Especially, in the case of a wheel, weld lines often occur, partly because the disk is provided with numerous decorative holes to enhance the effect of cooling and for aesthetic reasons, and partly because bolt holes exist to join the drum of the body of the automobile. Because of frequent occurrence of weld lines, resin wheels have not yet been manufactured by injection molding in practice, nor resin wheels fabricated by injection molding have been put into the market.

SUMMARY OF THE INVENTION

In view of the foregoing problems with the prior art wheels, it is an object of the present invention to provide a resin wheel which is excellent in mechanical characteristics such as impact resistance, bending strength, rigidity, heat resistance, fatigue resistance, and creep resistance, is economical to fabricate, and can be mass-produced.

It is a more specific object of the invention to provide a resin wheel which is lightweight and excellent in strength, especially characteristics such as bending strength, impact resistance, rigidity, heat resistance, fatigue resistance, and creep resistance.

It is another object of the invention to provide a resin wheel which has uniform physical properties and varies little in quality among manufactured commercial products.

It is a further object of the invention to provide a resin wheel which is adapted for mass production and can be fabricated cheaply.

It is a still further object of the invention to provide a resin wheel which is divided into two or more pieces, whereby various kinds of resin wheels can be constructed.

The resin wheel according to the invention consists of two or more molded parts coupled together. Individual parts are separately molded, and then one of them is screwed into the other or others, whereby they are fitted together. More specifically, two independent parts are rotated through a given angle in opposite directions so that the convex portions may be fitted in the concave portions. As an example, these two parts are a bolt and a nut.

The novel resin wheel consists of two or more molded parts which are fitted together by screwing the convex portions into the concave portions, but the weight of the wheel is not increased so much. Also, this wheel is not inferior to a one-piece wheel in strength. Furthermore, this split type resin wheel sufficiently retains the advantages of the two-piece wheel that lower costs and greater freedom of design are provided.

Other objects and features of the invention will appear in the course of the description thereof which follows.

DETAILED DESCRIPTION OF THE INVENTION

Figure 1:
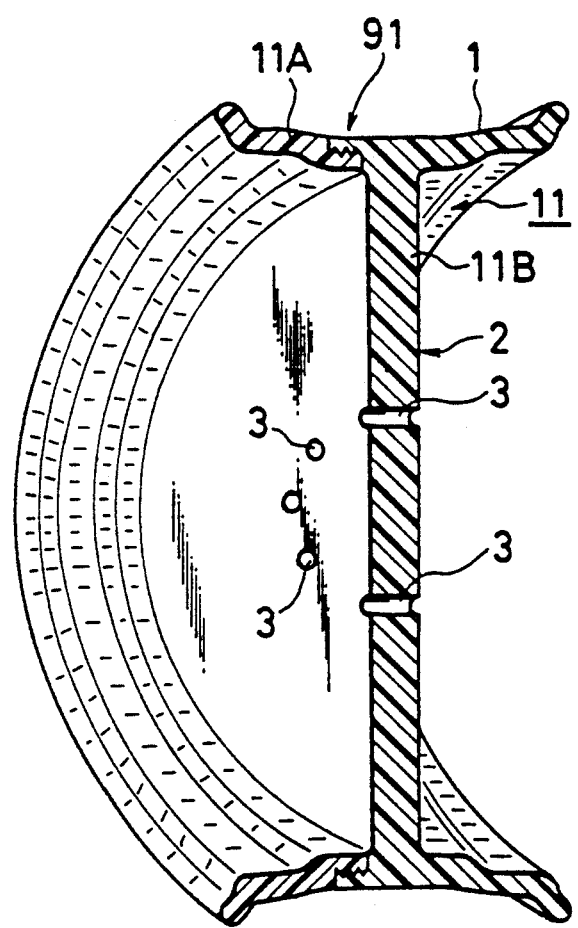
FIGS. 1, 2A, 2B, 3 are cross-sectional views of resin wheels according to the invention.
Figure 2A:
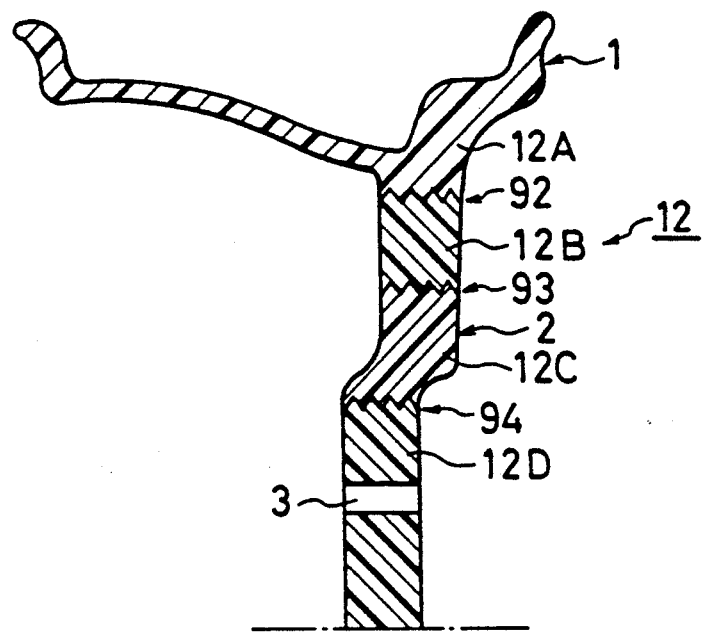
Figure 2B:
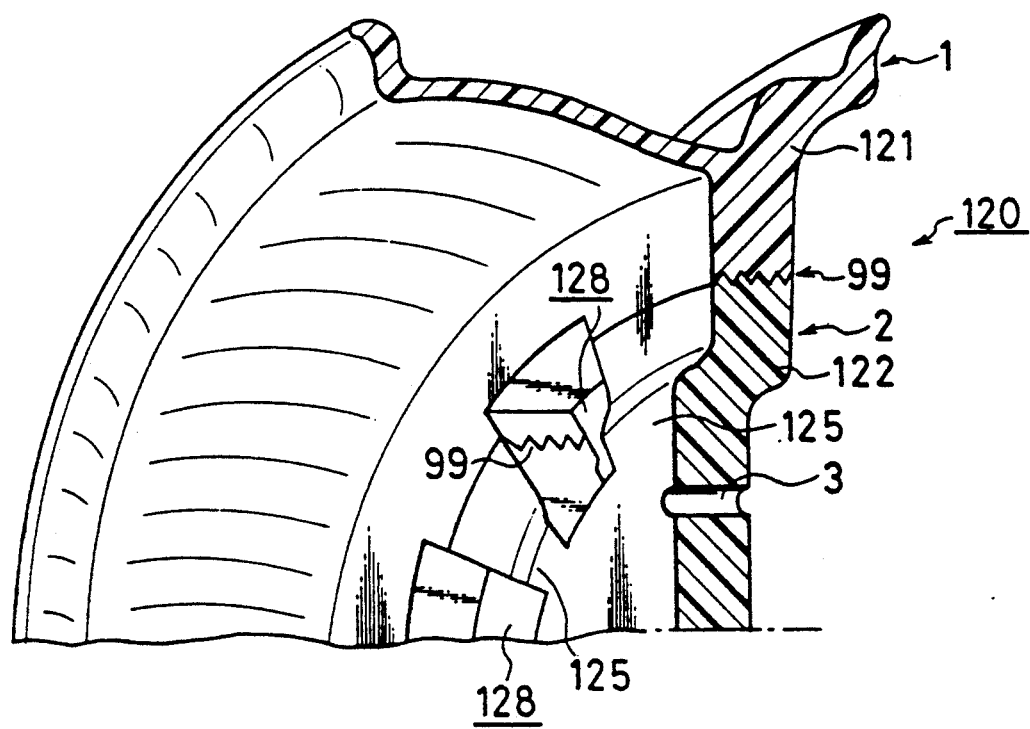
Figure 3:
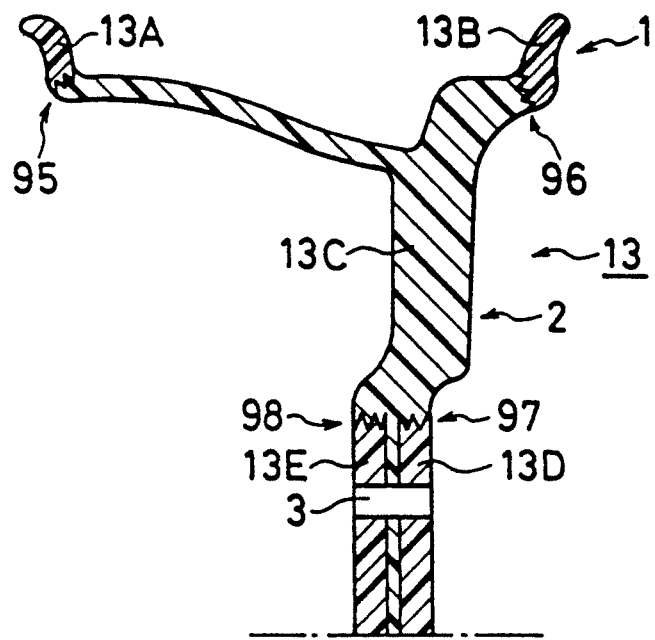
Figure 4:
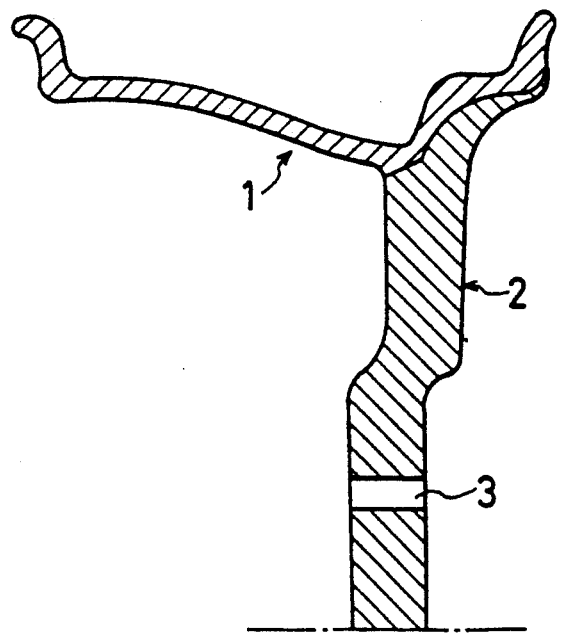
FIG. 4 is a cross-sectional view of the prior art resin wheel.

Referring to FIGS. 1, 2A, 2B, and 3, there are shown resin wheels according to the invention. It is to be noted that FIGS. 2A and 3 are cross sections of the upper halves of the resin wheels. In these and the subsequent figures, indicated by numeral 1 is a rim. Indicated by numeral 2 is a disk. Hub bolt holes 3 are formed in the disk 2.

Each of these resin wheels according to the invention is split into plural parts. No limitations are imposed on the number of the plural parts. Also, no restrictions are placed on the position or positions at which the wheel is divided.

In FIG. 1, the resin wheel is generally indicated by numeral 11. This wheel 11 is divided into two parts, i.e., molded parts 11A and 11B, at the rim 1.

In FIG. 2A, the resin wheel is generally indicated by numeral 12. This wheel 12 is divided into molded parts 12A, 12B, 12C, and 12D at the disk.

In FIG. 2B, the resin wheel is generally indicated by numeral 120. This wheel 120 is divided into molded parts 121, 122, etc.

In FIG. 3, the resin wheel is generally indicated by numeral 13. This wheel 13 is divided into molded parts 13A, 13B, 13C, 13D, and 13E at the rim 1 and at the disk 2.

In FIGS. 1, 2A, 2B, and 3, each divided part is molded independently. These molded parts have fitting portions 91, 92, 93, 94, 95, 96, 97, 98, and 99 which are screwed into each other.

Figure 5A:
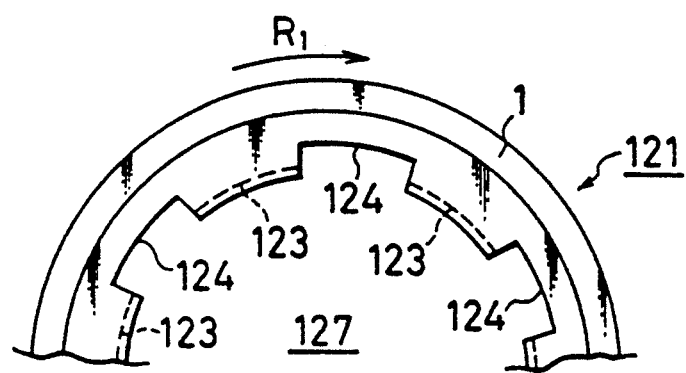
FIGS. 5A, 5B, 6A, and 6B are front elevations of the fitting portions of the resin wheels shown in FIGS. 2A and 2B.
Figure 5B:
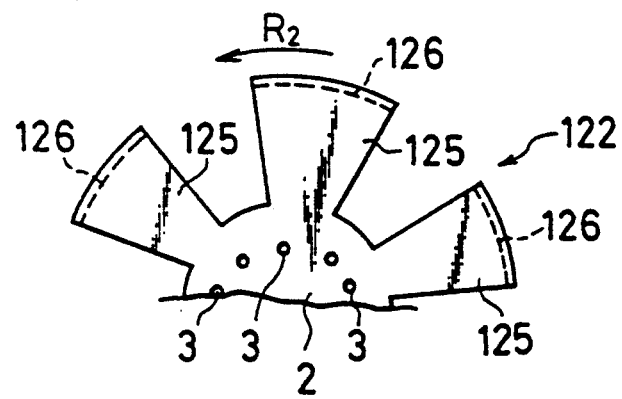

In FIGS. 5A and 5B, the divided part 121 of the wheel 120 forms the rim 1 and the outer periphery of the hub 2. A plurality of notches 124 are formed in the inner surface of the divided part 121. This inner surface 123 is threaded circumferentially except for the locations of the notches 124. The divided part 122 forms the central portion of the hub 2, and has a radial portion 125. The front end surface 126, or the outer surface, is circumferentially threaded. In assembly, the divided part 122 is fitted into the central hole 127 formed in the divided part 121 while rotating the divided part 122 in such a way that the threaded portion 123 mates with the threaded portion 126. The divided parts 121 and 122 are rotated in directions indicated by $R_1$ and $R_2$, respectively. Of course, one of the divided parts can be held at rest. In this way, the wheel 120 having windows 128 is completed as shown in FIG. 2B.

Figure 6A:
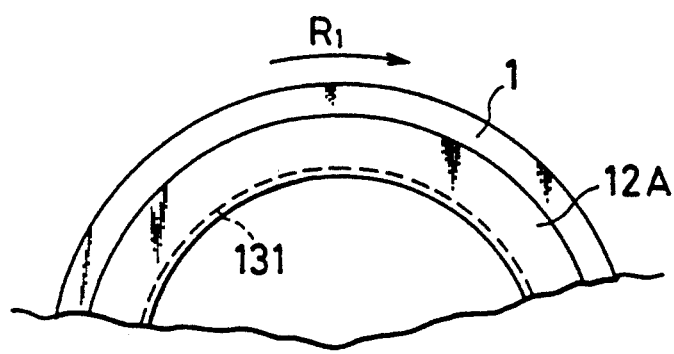
Figure 6B:
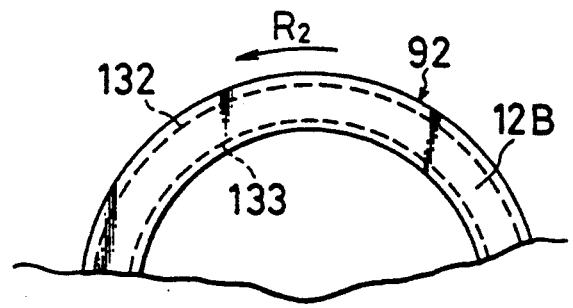

FIGS. 6A and 6B illustrate the manner in which the wheel 12 shown in FIG. 2A is assembled. The threaded inner surface 131 of the divided part 12A and the threaded outer surface 132 of the divided part 12B are screwed into each other to couple together the divided parts 12A and 12B. The threaded outer surface of the divided part 12C is screwed into the threaded inner surface 133 of the divided part 12B. The threaded outer surface of the divided part 12D is screwed into the threaded inner surface of the divided part 12C.

Figure 7:
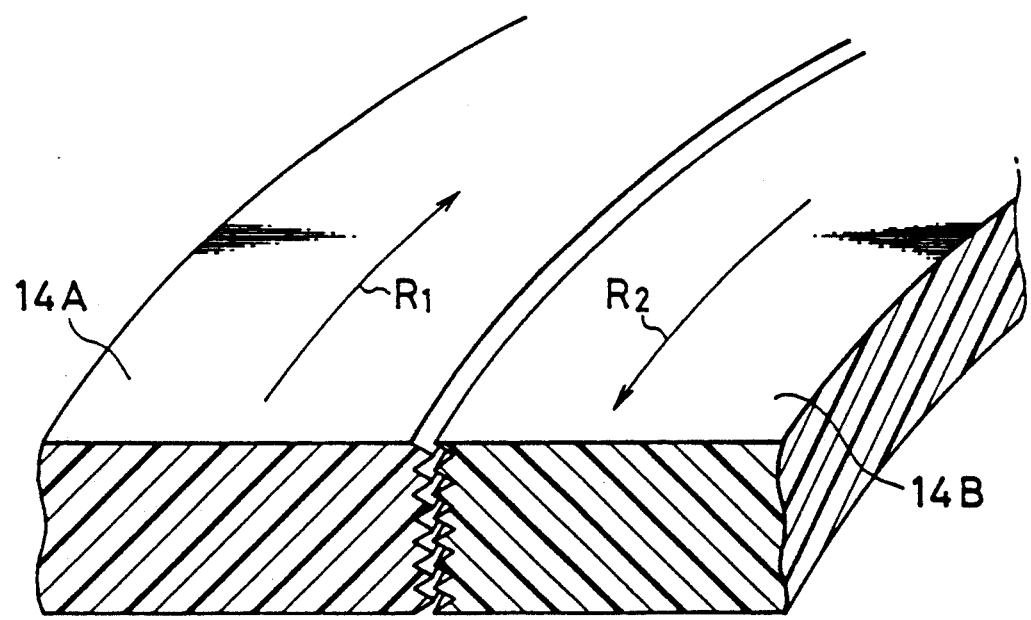
FIG. 7 is a perspective view in cross section of one example of a pair of fitting portions.

The shapes of the fitting portions are next described. The fitting portions are firmly coupled together by screwing the convex portion into the concave portion. FIG. 7 is a perspective view in cross section of a pair of fitting portions. In this figure divided molded parts 14A and 14B have an external thread and an internal thread on their respective fitting surfaces. Thus, the divided parts 14A and 14B mate with each other, and can be screwed into each other by rotating them in opposite directions indicated by $R_1$ and $R_2$, respectively.

Figure 8A:
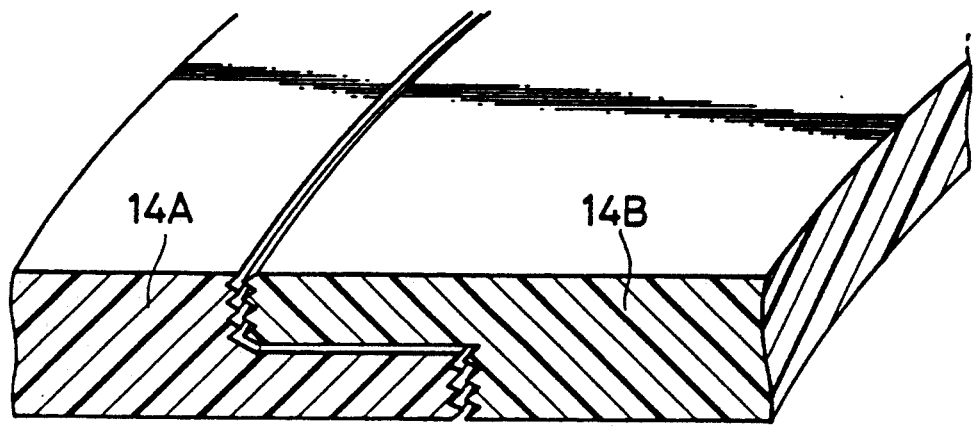
FIGS. 8A, 8B, and 8C are cross-sectional views of other examples of a pair of fitting portions.
Figure 8B:
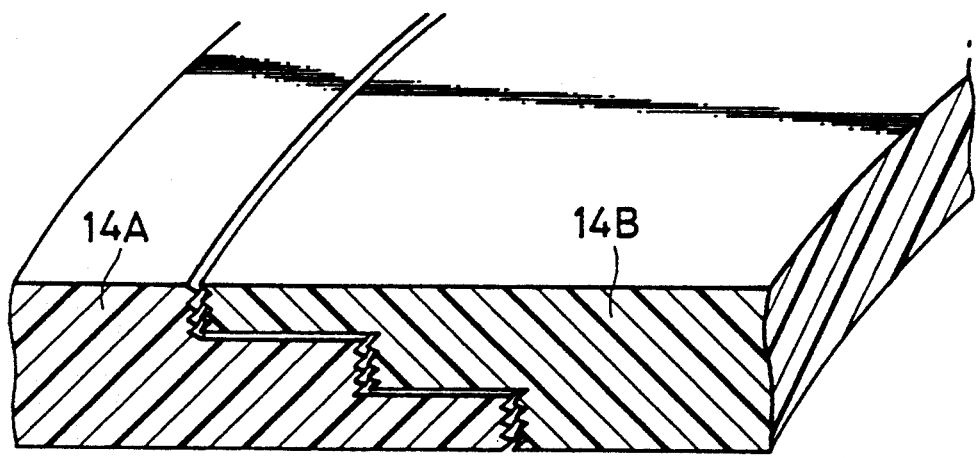
Figure 8C:
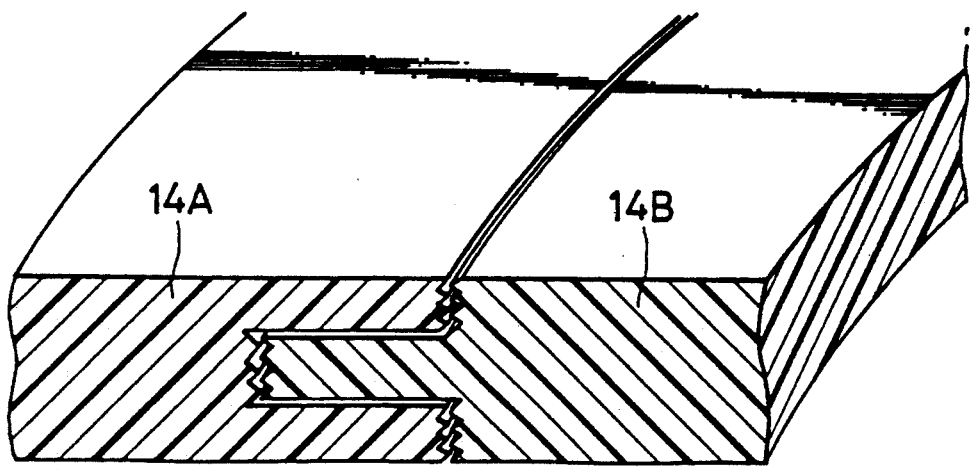

As shown in FIGS. 8A, 8B, and 8C, a plurality of fitting portions are provided in the divided parts 14A and 14B. These structures allow the divided parts 14A and 14B to be fitted together more firmly and rigidly.

Figure 9A:
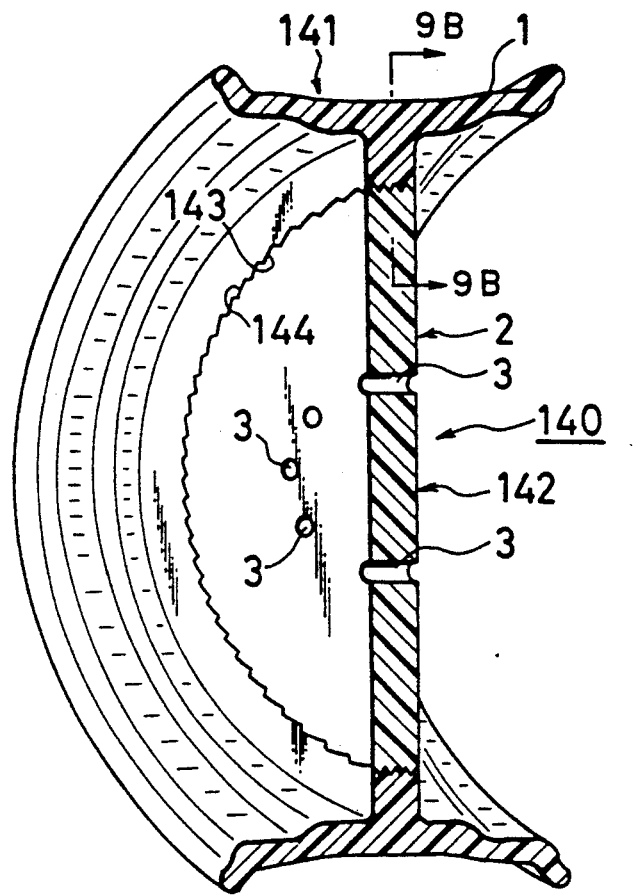
FIG. 9A is a perspective view in cross section of another example of a pair of fitting portions.
Figure 9B:
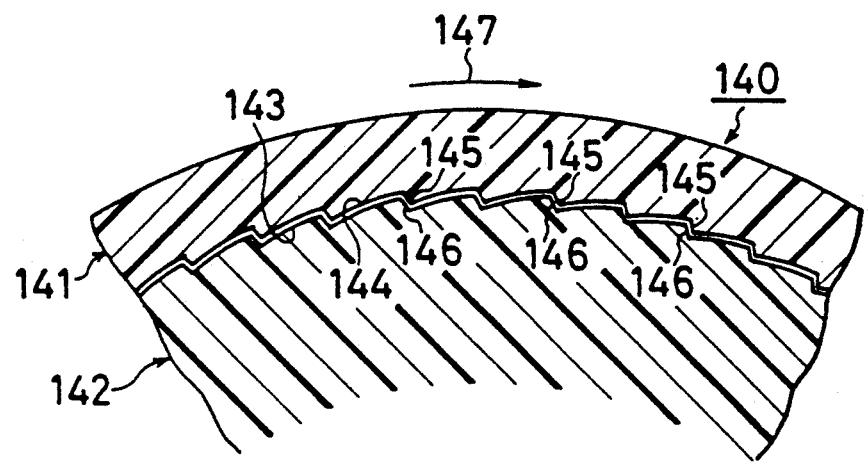
FIG. 9B is a cross-sectional view taken on line 9B—9B FIG. 9A.

As shown in FIGS. 9A and 9B, screw threads each taking the form of a ratchet can be formed to prevent the fitting portions from loosening and to enhance the strength. The wheel 140 consists of a divided part 141 on the side of the rim and a divided part 142 on the side of the center of the hub. The thread 143 on the outer surface of the divided part 142 is screwed into the thread 144 on the inner surface of the divided part 141. Both threads 143 and 144 extend circumferentially. Ratchets 145 and 146 are formed circumferentially regularly. Therefore, the divided part 141 can be rotated in the direction indicated by the arrow 147, i.e., the direction to tighten them. However, the divided part 141 does not rotate in the opposite direction, i.e., the direction to loosen them.

Figure 10:
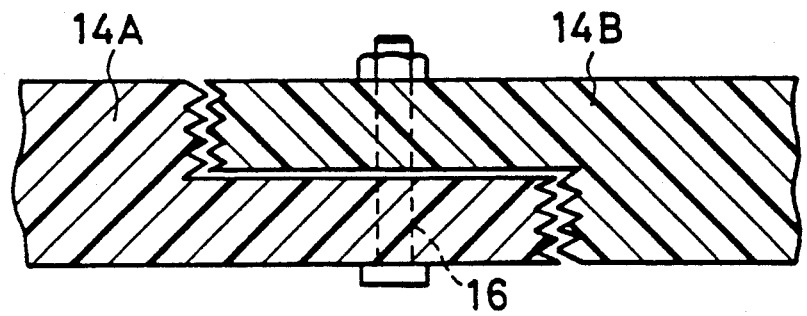
FIG. 10 is a cross-sectional view of a further example of a pair of fitting portions.

As shown in FIG. 10, coupling multi-stage fitting portions using a bolt 16, rivet, or the like is effective in preventing loosening.

Figure 11A:
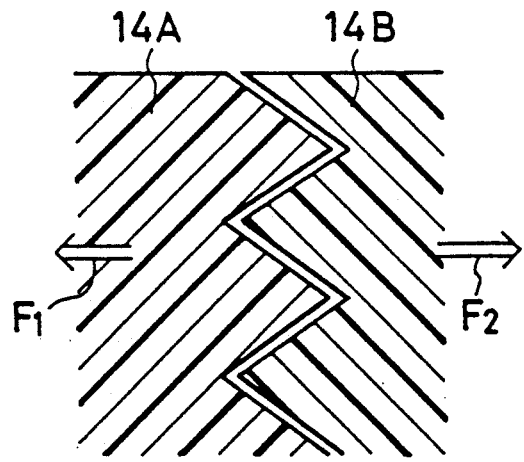
FIGS. 11A, 11B, 11C, 11D, 11E, 11F are enlarged cross sections of fitting portions, for showing the shapes of threaded portions.
Figure 11B:
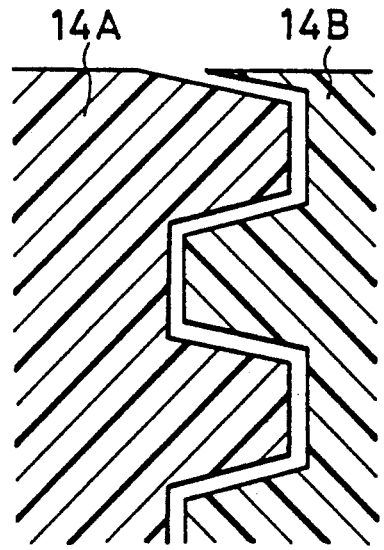
Figure 11C:
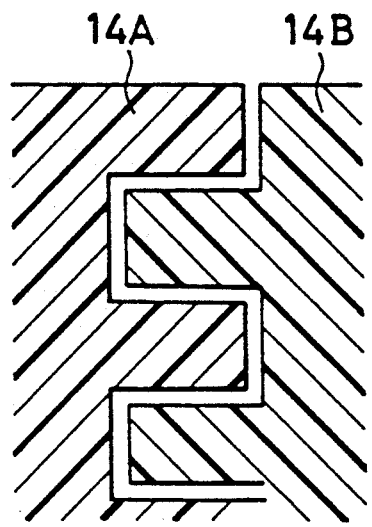
Figure 11D:
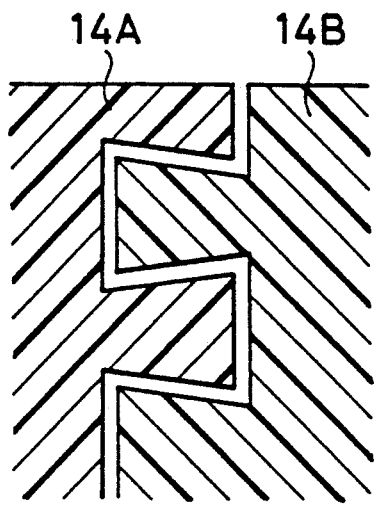
Figure 11E:
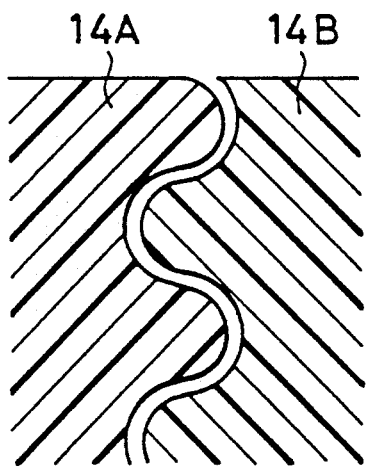
Figure 11F:
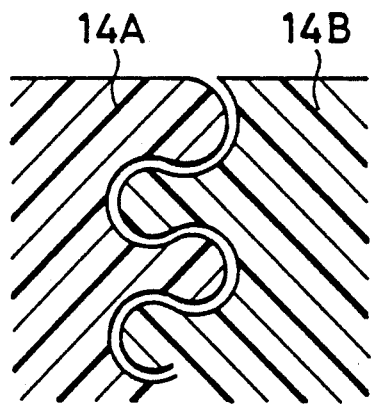

As shown in FIG. 11A, if tensile forces $F_1$ and $F_2$ act in opposite directions, fitting portions will disengage from each other, thus disengaging divided parts 14A and 14B from each other. To prevent this disengagement, improvements in the shapes of the threads of the fitting portions are effective as shown in FIGS. 11B-11F.

It is to be understood that the shapes for preventing loosening and disengagement merely constitute examples of the invention and that any other shape can be adopted within the scope of the invention as long as the object is achieved.

In the novel resin wheel, adhesive is sandwiched between fitting concave and convex surfaces of divided molded parts 14A and 14B shown in FIGS. 7-11F, or adhesive is put in the gap between the contacting surfaces of divided molded parts 14A and 14B between multi-stage fitting portions, to bond together the divided parts 14A and 14B. Alternatively, these portions are bonded together by thermally melting them. These configurations are quite effective in improving the strength of the fitting portions and also in preventing loosening and disengagement.

The divided parts of the novel resin wheel can be molded from all synthetic resins including various thermosetting resins and thermoplastic resins.

More specifically, the thermosetting resins include phenolic resin, epoxy resin, unsaturated polyester resin, vinyl ester resin, polyurethane resin, diallyl phthalate resin, alkyd resin, urea resin, melamine resin, and modifications of them. In these substances, unsaturated polyester resin, vinyl ester resin, phenolic resin, and epoxy resin are preferable. Especially, vinyl ester resin and unsaturated polyester resin are preferable. These thermosetting resins can be used alone or in combination.

The thermoplastic resins include various polyamide reins, such as nyln 6, nylon 6,6, nylon 4,6, nylon 6,10, nylon 10, nylon 11, and nylon 12, polybutylene terephthalate (PBT), polyphenylene sulfide (PPS), acetal resin (POM), polycarbonate (PC), polyethylene terephthalate (PET), polypropylene (PP), polyether sulfone (PES), polysulfone (PSF), polyether etherketone (PEEK), polyphenylene oxide (PPO), polyamidimide (PAI), polyimide (PI), polyester, and various liquid crystalline polymers. In these materials, various polyamide resins, PBT, PPS, POM, PC, PES, PI, PAI, PEEK, polyester, and various liquid crystalline polymers are preferable. Since the material for the wheels of the present invention is required to have certain heat resistance, it is especially preferable to use a partial aromatic polyamide resin wherein aromatic groups are partially substituted for main chains of aliphatic polyamide. The ordinary nylon resins, such as nylon 6, nylon 6,6, nylon 6,10, nylon 12 and nylon 46, are most popular as engineering plastics for use in construction and use requiring strength. However, since these nylon resins are insufficient in heat resistance and water absorptivity, their uses are greatly limited. On the contrary, the partial aromatic polyamide resin contains an appropriate amount of aromatic units in the main chains. Therefore, although the partial aromatic polyamide possesses high rigidity, it has excellent moldability because of its good thermally melting property. Thus, the products molded by the partial aromatic polyamide resin have also better heat resistance and water absorptivity than those of products molded by the ordinary nylons. Further, since a basic structure of the polymer is an amide-bond, the partial aromatic polyamide resin is available at a cost equal to those of the ordinary nylons. The partial aromatic polyamide resin may be used for impregnating short and long reinforcing fibers. These thermoplastic resins can be used alone or in combination.

It is possible to add a requisite amount of various fillers, age resistors, crosslinking agents, oils, plasticizers, oligomers, and elastomers to the above-described synthetic resins to improve the weatherability, heat resistance, wear resistance, fluidity, coefficient of thermal expansion, flame resistance, chemical resistance, and other characteristics.

In the present invention, the reinforcing fibers added to the synthetic resin described above can be made of glass, carbon, graphite, aramide, polyethylene, ceramics such as SiC, and $Al_2O_3$, metals such as boron and stainless steel. If the diameter of the reinforcing fibers is too small, then the synthetic resin is not reinforced sufficiently. Conversely, if the diameter is too great, then it is difficult to carry out injection molding, and the moldability is low. Therefore, the diameter of the reinforcing fibers is 0.1 to 100 $\mu$m, preferably 0.5 to 50 $\mu$m.

If the amount of the added reinforcing fibers is too small, then the reinforcement does not produce a sufficient effect. Conversely, if the amount is too great, then the amount of the resin forming the matrix is insufficient, and the moldability is low. Preferably, therefore, the ratio of the amount of the added reinforcing fibers to the amount of the molding material is 5 to 70% by volume, more preferably 10 to 60% by volume.

The wheel of the invention is made by the specific reinforcing fibers. Namely, the thermoplastic resin and reinforcing fibers described above are kneaded in kneading machine at a predetermined mixing ratio, and formed into a molding material in a shape of a grain which is called as a pellet. The length of the reinforcing fibers contained in the produced pellet is 0.1 to 0.5 mm, which is called as a short-fiber reinforced thermoplastic resin. This short-fiber reinforced thermoplastic resin is insufficient in strength. On the contrary, a long-fiber reinforced thermoplastic resin has fibers with lengths of more than 1 mm, preferably more than 2 mm, which is excellent in strength and moldability. The long-fiber reinforced thermoplastic resin can be produced as follow.

Rovings of the reinforcing fibers drawn out of bobbins are passed through molten thermoplastic resin at a low viscosity to impregnate the mono-filament surface with the resin. Then, the impregnated filaments are passed through a cooling pipe so that they are lined up in the drawing-out direction and solidified. Thus obtained continuous rovings impregnated with the thermoplastic resin are cut into a predetermined length to obtain a grain material of fibers. (Japanese Patent applications Laid-Open Publication No. 57-181852).

As descried above, the length of the reinforcing fibers to be contained in the long-fiber reinforced thermoplastic resin can be adjusted as desired. For a wheel material, in a standpoint of strength, as the length of the fiber increases, the strength is effective. On the contrary, in a viewpoint of molding a product, as the length of the fiber increases, the fluidity of the resin is deteriorated, thus resulting in occurrence of voids and strong fiber orientation. Therefore, for preferable long-fiber reinforced thermoplastic resin material used in the present invention, rods having a diameter of 2.5 to 3 mm, produced by a pulsation as described above, are cut into grains of 1 to 30 mm, among which grains of 2 to 20 mm are preferably, above all, grains of 5 to 15 mm being optimum. Since the grains are formed by pultrusion, the gaps between the fibers are sufficiently impregnated with the resin though the fibers are long. This kind of resin reinforced with long fibers or long-fiber reinforced thermoplastic resin is much superior in mechanical properties to normal resin reinforced with short fibers or short-fiber reinforced thermoplastic resin as described above, but the moldability or the workability is hardly deteriorated; rather the moldability and the workability of the resin reinforced with long fibers are comparable to those of the resin reinforced with short fibers. Addition of a normal resin reinforced with short fibers is quite effective in improving the workability of the resin reinforced with long fibers. In this case, the amount of the added resin reinforced with short fibers accounts for less than 70% by weight of the total amount, preferably less than 60%.

In the present invention, any of compression molding, injection molding, and injection compression molding can be used to mold the divided parts from the molding materials described above. A weld line which would normally be produced by injection molding can be prevented by dividing the wheel into two or more pieces. Taking account of this fact, it can be said that the present invention yields especially great advantages when the wheel is molded by injection molding or injection compression molding. The divided molded parts of the resin wheel can be formed by using any one of the above-described three methods or using plural methods in combination.

When injection compression molding is employed, the molding dies are opened slightly, or the molding dies are closed with a weak mold-clamping force. Then, the material is injected into the mold. Thereafter, the mold-clamping force is increased to mold the wheel under compression. When injection compression molding is utilized, molten resin is injected between the upper and lower molding dies by an injection cylinder or extruder, the dies being mounted between presses. The dies are closed before or after the supply of the resin.

In recent years, energy saving has been demanded by the request of society seeking after environmental protection Hence, automobile parts have been required to be reduced in weight. Especially, lighter unsprung members produce conspicuous effects. Also, unsprung members are required to be reduced in weight, for improving the maneuverability.

For these reasons, it is desired that a wheel be equipped with a combination of a reinforcing structure for further improving the strength and a weight-reducing structure. These structures can be introduced in the whole wheel, or they can be installed only in the rim, disk, or in other requisite location.

Figure 12:
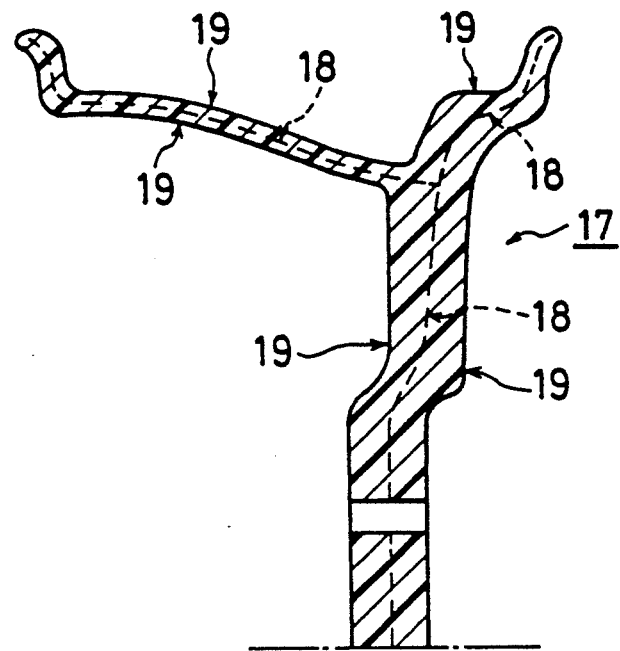
FIG. 12 is a cross-sectional view of yet other resin wheel according to the invention.

An example of the reinforcing structure is shown in FIG. 12, where a kind of reinforcing layer is formed as an intermediate layer 18 of the wheel body 17 or as a surface layer 19. In this reinforcing layer, reinforcing fibers are contained at an increased proportion. Alternatively, the intermediate layer 18 or the surface layer 19 is composed of reinforcing members or the like. In FIG. 12, the boundary line between the divided molded parts is omitted.

In this case, examples of the material of the reinforcing layer include glass, carbon, graphite, aramide, ceramics, such as SiC and $Al_2O_3$, and metals, such as boron and stainless steel. These materials can take various forms. Optimum forms include roving consisting of long fibers arranged in one direction, cloth, braid, twist yarn, net, lines of, or a sheet of, a resin in which arranged fibers are held, and three-dimensional woven fabric.

Where a reinforcing layer is inserted in a wheel, insert molding is used for advantage. That is, a filler of a given shape is previously molded. The molded filler is placed in a given location within a mold, and then the wheel is molded by injection molding.

Figure 13A:
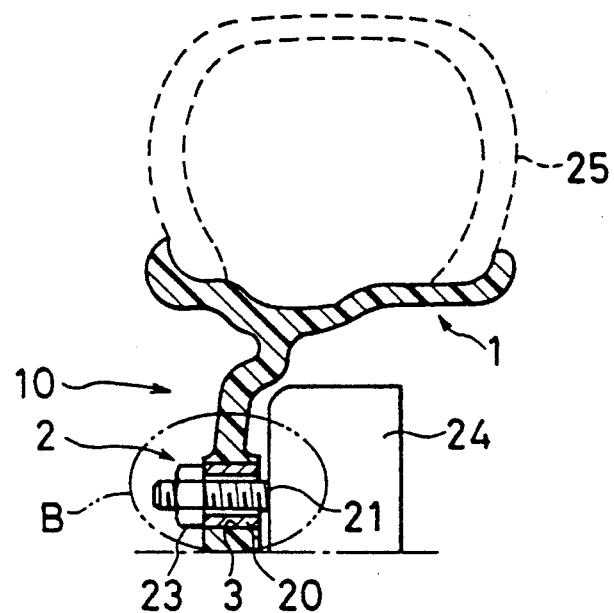
FIG. 13A is a cross-sectional view of the vicinities of the hub of a still further resin wheel according to the invention.
Figure 13B:
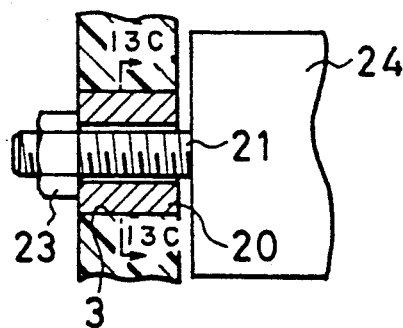
FIG. 13B is an enlarged view of portion B of FIG. 13A.
Figure 13C:
FIG. 13C is a cross-sectional view taken along line 13C—13C of FIG. 13B.

Normally, a wheel is attached via a hub bolt to a disk adjacent to a brake drum or brake disk and so the vicinities of the hub bolt hole are subjected to heat generated by the brake. If the wheel is used for a long time, the resin softens or creep occurs, causing stress relaxation. As a result, the hub nut is loosened. Structures for solving this problem are shown in FIGS. 13A, 13B, and 13C. FIG. 13A is a cross-sectional view of the surroundings of a hub. FIG. 13B is a cross-sectional view of portion B of FIG. 13A. FIG. 13C is a cross-sectional view taken on line 13C—13C of FIG. 13B. A bushing 20 having high rigidity, high strength and heat resistance is fitted in the hub bolt hole 3 in a resin wheel 10. Preferably, the force with which a hub nut 23 is tightened against a hub bolt 21 is transmitted to a brake drum 24 via the bushing 20. Indicated by 25 is a tire. The optimum materials of the bushing 20 include metals, heatproof plastics, heatproof plastics reinforced with fibers, carbon composites reinforced with carbon fibers, and ceramics.

Figure 14:
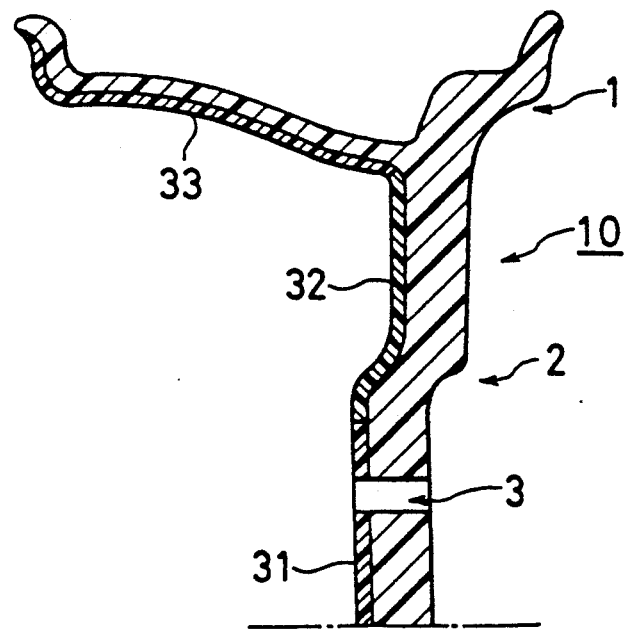
FIG. 14 is a cross-sectional view of an additional resin wheel according to the invention.

A heat insulator can be formed by insert molding on those surfaces of the disk and of the rim which face the brake drum to provide isolation of heat from the brake drum. As shown in FIG. 14, this heat insulator can be formed on a part 31 of the surface of the disk 2, the whole surface of the disk 2, i.e., surfaces 31 and 32, a part or all of the surface 33 of the rim 1, or the whole surface on the side of the brake drum, i.e., surfaces 31, 32, and 33. The heat insulator can be made of heatproof plastics, ceramics, inorganic materials, sheets reinforced with these materials, and slate consisting of asbestos or the like. Any material can be used as long as it shows both heat insulation and high strength.

The novel resin wheel has the advantage that a device having other function can be buried in the wheel and molded integrally with the wheel. As an example, if an abnormality-warning device such as a puncture-warning device is buried in the wheel and molded integrally with the wheel, a safety automotive foot component in which a wheel is integral with a tire is offered. A fail-safe mechanism comprising ribs extending upright from the rim of a wheel can be easily molded integrally with the wheel.

The novel resin wheels are used not only as the wheels of automobiles such as passenger cars but also as the wheels of vehicles such as buses, trucks, railroad cars, subway cars, linear motor cars, airplanes, motorcycles, bicycles, golf carts, go-carts, and other leisure carts used in recreation parks.

What is claimed is:

1. A resin wheel comprising a rim and a disk, said wheel being formed of a plurality of independently molded parts, said independently molded parts having fitting portions to be screwed into each other for constituting said wheel, said fitting portions having screw threads and ratchets formed on the screw threads, said ratchets inclining in a direction to allow the molded parts to engage together along the screw threads and to prevent the fitting portions from loosening to thereby enhance the strength of the wheel, said wheel being formed of a mixture of a thermoplastic resin, a long-fiber reinforced thermoplastic resin, and a short-fiber reinforced thermoplastic resin by one of compression molding, injection molding and injection compression molding methods.

2. The resin wheel of claim 1, wherein the wheel includes two independently molded parts divided at the rim, the two parts being coupled together.

3. The resin wheel of claim 1, wherein the wheel includes more than two independently molded parts divided at the disk, all the parts being coupled together.

4. The resin wheel of claim 1, wherein the wheel includes more than three independently molded parts divided at the rim and the disk, all the parts being coupled together.

5. The resin wheel of claim 1, wherein the fitting portion of one of the independently molded parts has an external thread, and the fitting portion of another of the independently molded part has an internal thread into which the external thread is screwed.

6. The wheel of claim 1, wherein adhesive is put between the fitting portions of the independently molded parts.

7. The wheel of claim 1, wherein the fitting portions of the independently molded parts are bonded together by melting.

8. The resin wheel of claim 1, further comprising a heat insulator formed at least on a part of surfaces of the disk and the rim on a side of a brake drum.

9. The resin wheel of claim 1, wherein the thermoplastic resin is a partial aromatic polyamide resin.

10. The resin wheel of claim 1, wherein a blending amount of the fibers to the resin is 5 to 70% by volume, and a mixing ratio of said short-fiber reinforced resin is less than 70% by weight of a total amount.

11. The resin wheel of claim 1, wherein a length of said long-fibers is a 1 to 30 mm, and a length of said short-fibers is 0.1 to 0.5 mm.

12. The resin wheel of claim 1, wherein the reinforcing fibers comprise at least one of glass, carbon, graphite, aramide, polyethylene, ceramic and metal.

13. The resin wheel of claim 1, wherein said long-fiber reinforced thermoplastic resin has forms of grains before mixed with the other materials, said long-fiber reinforced thermoplastic resin being prepared by passing rovings of reinforcing fibers through a molten thermoplastic resin at a low viscosity to impregnate monofilaments thereof with the resin, cooling the reinforcing fibers with the resin to solidify, and cutting the continuous rovings with the resin into a predetermined length to obtain the grain material of fibers.

14. The resin wheel of claim 1, wherein each independently molded part has a plurality of the fitting portions radially and axially spaced apart from each other so that the radially and axially spaced fitting potions of the one molded part engage radially and axially spaced fitting portions of the other molded part.

15. The resin wheel of claim 14, wherein the radially and axially spaced fitting portions of the independently molded parts are tightened together by one of a bolt and rivet.

16. A resin wheel comprising a rim and a disk, said wheel being formed of a plurality of independently molded parts, said independently molded parts including fitting portions to be coupled together for constituting the wheel, said fitting portions having screw threads and ratchets formed on the screw threads, said ratchets inclining in a direction to allow the molded parts to engage together along the screw threads and to prevent the fitting portions from loosening to thereby enhance the strength.

17. The resin wheel of claim 16, further comprising a heat insulator formed at least on a part of surfaces of the disk and the rim on a side of a brake drum.

18. A resin wheel comprising a rim and a disk, said wheel being formed of a plurality of independently molded parts, said independently molded parts including fitting portions to be coupled together for constituting the wheel, said fitting portions having screw threads and ratchets formed on the screw threads, said ratchets inclining in a direction to allow the molded parts to engage together along the screw threads and to prevent the fitting portions from loosening to thereby enhance the strength, said wheel being formed of a mixture of a thermoplastic resin, a long-fiber reinforced thermoplastic resin and a short-fiber reinforced thermoplastic resin, a blending amount of the fibers to the resin being 5 to 70% by volume and a mixing ratio of said short-fiber reinforced resin being less than 70% by weight of a total amount, said long-fiber reinforced thermoplastic resin having forms of grains before mixed with the other materials, said long-fiber reinforced thermoplastic resin being prepared by passing rovings of reinforcing fibers through a molten thermoplastic resin at a low viscosity to impregnate monofilaments thereof with the resin, cooling the reinforcing fibers with the resin to solidify, and cutting the continuous rovings with the resin into a predetermined length to obtain the grain material of fibers.

* * * * *